(12) United States Patent
Malinofsky

(10) Patent No.: US 10,360,785 B2
(45) Date of Patent: Jul. 23, 2019

(54) ARTICLE TRACKING SYSTEM AND METHOD

(71) Applicant: Sita Information Networking Computing USA, Inc, Atlanta, GA (US)

(72) Inventor: Andrew Eric Malinofsky, Atlanta, GA (US)

(73) Assignee: SITA INFORMATION NETWORKING COMPUTING USA, INC., Atlanta, GA (US)

( * ) Notice: Subject to any disclaimer, the term of this patent is extended or adjusted under 35 U.S.C. 154(b) by 0 days.

(21) Appl. No.: 15/481,714

(22) Filed: Apr. 7, 2017

(65) Prior Publication Data

US 2018/0293871 A1 Oct. 11, 2018

(51) Int. Cl.
| | |
|---|---|
| *G08B 1/08* | (2006.01) |
| *G08B 21/24* | (2006.01) |
| *G01S 5/14* | (2006.01) |
| *G06Q 10/08* | (2012.01) |
| *H04W 4/80* | (2018.01) |
| *H04W 40/24* | (2009.01) |

(52) U.S. Cl.
CPC ............. *G08B 21/24* (2013.01); *G01S 5/14* (2013.01); *G06Q 10/0833* (2013.01); *H04W 4/80* (2018.02); *H04W 40/244* (2013.01)

(58) Field of Classification Search
None
See application file for complete search history.

(56) References Cited

U.S. PATENT DOCUMENTS

| | | |
|---|---|---|
| 5,748,850 A | 5/1998 | Sakurai |
| 5,793,639 A | 8/1998 | Yamazaki |
| 5,897,620 A | 4/1999 | Walker |
| 6,044,353 A | 3/2000 | Pugliese, III |
| 6,259,405 B1 | 7/2001 | Stewart |

(Continued)

FOREIGN PATENT DOCUMENTS

| | | |
|---|---|---|
| DE | 102009020228 A1 | 11/2010 |
| EP | 1308864 A1 | 5/2003 |

(Continued)

*Primary Examiner* — Julie B Lieu
(74) *Attorney, Agent, or Firm* — Morris, Manning & Martin, LLP; Daniel E. Sineway, Esq.; R. Lee Strasburger, Jr. Esq.

(57) ABSTRACT

A system and method for tracking an article is described. The article may be baggage passing through an airport terminal or another venue. The system comprises a beacon associated with a baggage article, a plurality of relaying bridges, and a tracking service. Short-range radio signals including a beacon identifier and a beacon transmission power are emitted by the beacon associated with a baggage article and detected by a plurality of relaying bridges. The relaying bridges calculate a received signal strength indicator (RSSI), convert the short-range radio signal to a relay signal and transmit the relay signal including a unique relaying bridge identifier and RSSI information via a network. The tracking service receives data from the relay signal, attaches a time stamp to the received data, stores the time-stamped data, and determines from the stored data the time when the article arrives at a point of interest.

36 Claims, 6 Drawing Sheets

Figure 1

(56) References Cited

U.S. PATENT DOCUMENTS

| | | |
|---|---|---|
| 6,414,635 B1 | 7/2002 | Stewart |
| 6,553,336 B1 | 4/2003 | Johnson |
| 6,735,630 B1 | 5/2004 | Gelvin |
| 6,736,322 B2 | 5/2004 | Gobburu |
| 6,758,394 B2 | 7/2004 | Maskatiya |
| 6,972,682 B2 | 12/2005 | Lareau |
| 7,027,808 B2 | 4/2006 | Wesby |
| 7,275,689 B2 | 10/2007 | Mak |
| 7,323,991 B1 * | 1/2008 | Eckert ................. G07C 9/00111 340/572.1 |
| 7,486,171 B2 | 2/2009 | Kim |
| 7,599,847 B2 | 10/2009 | Block |
| 8,229,458 B2 | 7/2012 | Busch |
| 8,467,726 B2 | 6/2013 | Shirakata |
| 8,509,441 B2 | 8/2013 | Yoon |
| 8,521,681 B2 | 8/2013 | Ouchi |
| 8,631,358 B2 | 1/2014 | Louch |
| 8,665,238 B1 | 3/2014 | Gossweiler, III |
| 8,949,142 B1 | 2/2015 | Angrish |
| 8,977,568 B1 | 3/2015 | Schattauer |
| 9,024,752 B2 | 5/2015 | Tumayan |
| 9,026,461 B2 | 5/2015 | Calman |
| 9,047,512 B2 | 6/2015 | Otis |
| 9,134,955 B2 | 9/2015 | Healey |
| 9,141,325 B2 | 9/2015 | Dersy |
| 9,239,246 B2 | 1/2016 | Jones |
| 9,275,550 B1 | 3/2016 | Stefani |
| 9,420,562 B1 | 8/2016 | Cai |
| 9,541,632 B2 | 1/2017 | Frank |
| 9,552,564 B1 | 1/2017 | Martenis |
| 9,589,262 B2 | 3/2017 | Graylin |
| 9,589,405 B2 | 3/2017 | Cabouli |
| 9,599,989 B1 | 3/2017 | Brown |
| 9,710,920 B2 | 7/2017 | Utsunomiya |
| 9,749,831 B2 | 8/2017 | Lee |
| 9,781,575 B1 * | 10/2017 | Wan ........................ H04W 4/70 |
| 2005/0258230 A1 | 11/2005 | Wiater |
| 2007/0139199 A1 * | 6/2007 | Hanlon ..................... G01S 5/02 340/572.1 |
| 2008/0231447 A1 * | 9/2008 | Grossman ............... G01S 11/06 340/572.1 |
| 2009/0266882 A1 | 10/2009 | Sajkowsky |
| 2011/0068906 A1 | 3/2011 | Shafer et al. |
| 2012/0041313 A1 | 2/2012 | Tanaka |
| 2014/0223043 A1 | 8/2014 | Dersy |
| 2016/0026837 A1 | 1/2016 | Good et al. |
| 2016/0152350 A1 | 6/2016 | Puentes |
| 2016/0180255 A1 | 6/2016 | Goedemondt |
| 2017/0004444 A1 * | 1/2017 | Krasko ............... G06Q 10/0833 |
| 2017/0032263 A1 | 2/2017 | Yuan |
| 2017/0228951 A1 * | 8/2017 | Foot ........................ H04W 4/04 |
| 2017/0373775 A1 * | 12/2017 | Daoura ................... H04W 40/22 |
| 2018/0199172 A1 * | 7/2018 | Boily ...................... H04W 4/38 |

FOREIGN PATENT DOCUMENTS

| | | |
|---|---|---|
| EP | 0770546 B1 | 12/2003 |
| EP | 2932902 B1 | 12/2016 |
| EP | 1872294 B1 | 11/2017 |
| JP | 2003157984 A | 5/2003 |
| JP | 2017129981 A | 7/2017 |
| TW | M503134 U | 6/2015 |

\* cited by examiner

ARTICLE TRACKING SYSTEM AND METHOD

FIELD OF THE INVENTION

This invention relates to systems and methods for tracking an article during a journey.

BACKGROUND OF THE INVENTION

Within the airline industry, industry-wide regulations require baggage tracking. For decades, baggage tracking has been achieved using laser-scanned 1d barcode paper tags which are affixed to baggage articles during check-in. However, these laser scanning systems are antiquated, extremely expensive to install and maintain and do not allow for detailed tracking of baggage within the airport infrastructure. As the number of passenger journeys increases, there is a need to provide more precise tracking data to enable individual articles of baggage to be located more effectively and efficiently.

Any solution to these problems must satisfy the tracking, sorting and reconciliation requirements of the air transport industry. Additionally, an initial solution must be expandable and cost effective in order to effectively cover the whole journey made by the bag, which may include travel destinations outside of the airport, for example hotels, and car rental locations.

Known tracking solutions include using passive Radio Frequency Identification (RFID) inlays coded with passenger related data which are added to paper baggage tags. RFID scanners are used to interrogate the RFID inlays to determine the identity of each baggage tag. However, RFID scanners cost thousands of dollars each, resulting in the RFID systems being expensive to deploy throughout the baggage journey. A further problem with RFID systems is that a large number of RFID tags may be excited at once by a RFID scanner. This leads to the detection of a large number of conflicting signals which need to be resolved by the system, so increasing the technical complexity.

Global Positioning Systems (GPS) or Global System for Mobile Communication (GSM) are inappropriate solutions to the above problems as they are expensive and complex to operate on a global level and are not sufficiently accurate indoors.

There is therefore a need for an improved tracking system which overcomes or ameliorates the problems with known systems described above.

SUMMARY OF THE INVENTION

The invention is defined by the claims, to which attention is now drawn.

In a first aspect of the invention, an article tracking system comprises a beacon associated with an article for emitting a plurality of short-range radio signals, each short-range radio signal including a beacon identifier and a beacon transmission power; a plurality of relaying devices having known locations each for detecting the short-range radio signals, calculating a received signal strength indicator (RSSI) for each detected short-range radio signal, converting each detected short-range radio signal to a relay signal, and transmitting each of the relay signals, the relay signals including a unique relaying device identifier and RSSI information; timestamping means for attaching a time stamp to each relay signal; and a tracking device for continually receiving the relay signals from each relaying device, comparing a characteristic of the received relay signals from each relaying device to determine to which of the plurality of relaying devices the beacon is closest, and storing the time, beacon identifier and unique relaying device identifier of the closest relaying device.

Embodiments of the invention may have the advantage of providing a low cost and robust tracking system which is suitable for a wide variety of environments, for example, but not limited to, baggage tracking. Embodiments of the invention avoid the need to use high cost scanners such as are required for RFID based systems.

In an embodiment of the invention, the beacon is associated with the article by attaching the beacon to the article. This has the advantage of ensuring the beacon remains in close proximity to the article.

In another embodiment of the invention the beacon identifier includes a unique user identification number (UUID). This has the advantage of enabling the identification of a particular beacon.

In another embodiment of the invention the beacon identifier is associated with a baggage licence plate number (LPN). In an alternative embodiment, the beacon identifier is associated with a baggage licence plate number (LPN) by including the LPN in the beacon identifier. This has the advantage of integrating embodiments of the invention with existing baggage handling systems.

In another embodiment of the invention the timestamping means attaches a time stamp to each relay signal before the tracking device receives the relay signal. In an alternative embodiment, the timestamping means attaches a time stamp to each relay signal after the tracking device receives the relay signal. This has the advantage of enabling embodiments of the invention to identify when a particular relay signal was received.

In another embodiment of the invention the characteristic of the received relaying signals from each relaying device includes a calculated RSSI. In an alternative embodiment, the characteristic of the received relaying signals from each relaying device includes a calculated RSSI and a beacon transmission power. In another embodiment of the invention the tracking device determines to which of the plurality of relaying devices a beacon is closest based on a comparison of an average calculated RSSI for a plurality of relay signals associated with each relaying device. In an alternative embodiment, the tracking device determines to which of the plurality of relaying devices the beacon is closest based on an average ratio of calculated RSSI to beacon transmission power for a plurality of relay signals associated with each relaying device. These embodiments have the advantage of providing an estimate of the relative proximity of a beacon to each relaying device.

In another embodiment of the invention the characteristic of the received relay signals from each relaying device includes a calculated average distance between the beacon and each relaying device. In another embodiment the calculated average distance between the beacon and each of the relaying devices is based on the calculated RSSI and an inverse square law for a plurality of relay signals associated with each relaying device. In an alternative embodiment, the calculated average distance between the beacon and each of the relaying devices is based on a known power function of the average ratio of calculated RSSI to beacon transmission power of the relay signals for a plurality of relay signals associated with each relaying device. In another embodiment of the invention the tracking device determines to which of the plurality of relaying devices the beacon is closest based on an average calculated distance between the beacon and each of the relaying devices. These embodiments have the advantage of providing a calculated estimate of the distance between a beacon and each relaying device.

In another embodiment of the invention the tracking device sends a message including the stored time, beacon identifier and unique relaying device identifier to an external data processing system. In yet another embodiment of the invention, the tracking device sends a message including passenger related information received from an external database to an external data processing system. This has the advantage of enabling embodiments of the invention to communicate with external systems.

In another embodiment of the invention a plurality of beacons are each associated with an article. This has the advantage of allowing multiple articles to be tracked by embodiments of the invention.

In another embodiment of the invention the characteristic of the received relay signals from each relaying device includes a beacon identifier. This has the advantage of identifying which beacon a particular relay signal has originated from.

An embodiment of the invention further comprises an aggregator for aggregating relaying device messages and streaming the aggregated messages to the tracking device. This has the advantage of providing relay signals to embodiments of the invention as a data stream.

An embodiment of the invention further comprises the tracking device configured to determine a time of arrival for the article at a particular relaying device having a known location based on the time the article is located within an acceptable distance from the particular relaying device. This has the advantage of identifying when an article arrives at a known location.

An embodiment of the invention further comprises a mobile application for notifying a passenger or user when the article arrives at a particular relaying device having a known location. In an alternative embodiment, the mobile application is for displaying the journey of the article to a user. This has the advantage of communicating article-related information to a user.

An embodiment of the invention further comprises a mobile application for sending the beacon identifier and the article identifier to the tracking device.

An a second aspect of the invention, an article tracking method comprises associating a beacon with an article, the beacon emitting a plurality of short-range radio signals, each short-range radio signal including a beacon identifier and a beacon transmission power, detecting the short-range radio signals at a plurality of relaying devices, calculating a received signal strength indicator (RSSI) for each detected short-range radio signal, converting each short-range radio signal to a relay signal at a plurality of relaying devices having known locations, and transmitting each of the relay signals including a unique relaying device identifier and RSSI information, attaching a time stamp to each relay signal, receiving a plurality of relay signals from the relay devices at a tracking device, comparing a characteristic of the received relay signals from each relaying device to determine to which of the plurality of relaying devices the beacon is closest, and storing the time stamp, beacon identifier and unique relaying device identifier of the determined closest relaying device, and repeating the above step thereby to determine multiple locations of the article over time.

In an embodiment of the invention, associating the beacon with the article comprises attaching the beacon to the article. This has the advantage of ensuring the beacon remains in close proximity to the article.

In another embodiment of the invention attaching a time stamp to each relay signal before the tracking device receives the relay signal. In an alternative embodiment, the timestamping means attaches a time stamp to each relay signal after the tracking device receives the relay signal. This has the advantage of enabling embodiments of the invention to identify when a particular relay signal was received.

In another embodiment of the invention comparing the characteristic of the received relaying signals from each relaying device is based on a calculated RSSI. In an alternative embodiment, comparing the characteristic of the received relaying signals from each relaying device is based on a calculated RSSI and a beacon transmission power. In another embodiment of the invention determining to which of the plurality of relaying devices a beacon is closest is based on a comparison of an average calculated RSSI for a plurality of relay signals associated with each relaying device. In an alternative embodiment, determining to which of the plurality of relaying devices the beacon is closest is based on an average ratio of calculated RSSI to beacon transmission power for a plurality of relay signals associated with each relaying device. These embodiments have the advantage of providing an estimate of the relative proximity of a beacon to each relaying device.

In another embodiment of the invention comparing the characteristic of the received relay signals from each relaying device is based on a calculated average distance between the beacon and each relaying device. In another embodiment calculating the average distance between the beacon and each of the relaying devices is based on the calculated RSSI and an inverse square law for a plurality of relay signals associated with each relaying device.

In an alternative embodiment, calculating the average distance between the beacon and each of the relaying devices is based on a known power function of the average ratio of calculated RSSI to beacon transmission power of the relay signals for a plurality of relay signals associated with each relaying device. In another embodiment of the invention determining to which of the plurality of relaying devices the beacon is closest is based on an average calculated distance between the beacon and each of the relaying devices. These embodiments have the advantage of providing a calculated estimate of the distance between a beacon and each relaying device.

In another embodiment of the invention the tracking device sends a message including the stored time, beacon identifier and unique relaying device identifier to an external data processing system. In yet another embodiment of the invention, the tracking device sends a message including passenger related information received from an external database to an external data processing system. This has the advantage of enabling embodiments of the invention to communicate with external systems.

An embodiment of the invention further comprises associating each of a plurality of beacons with an article. This has the advantage of allowing multiple articles to be tracked by embodiments of the invention.

In another embodiment of the invention comparing the characteristic of the received relay signals from each relaying device is based on a beacon identifier. This has the advantage of identifying which beacon a particular relay signal has originated from.

An embodiment of the invention further comprises an aggregating relaying device messages and streaming the aggregated messages to the tracking device. This has the advantage of providing relay signals to embodiments of the invention as a data stream.

An embodiment of the invention further comprises determining a time of arrival for the article at a particular relaying device having a known location based on the time the article is located within an acceptable distance from the particular relaying device. This has the advantage of identifying when an article arrives at a known location.

An embodiment of the invention further comprises notifying a passenger or user with a mobile application when the article arrives at a particular relaying device having a known location. In an alternative embodiment, the mobile application is for displaying the journey of the article to a user. This has the advantage of communicating article-related information to a user.

An embodiment of the invention further comprises sending the beacon identifier and the article identifier to the tracking device with a mobile application.

DETAILED DESCRIPTION

Embodiments of the invention will now be described, by way of example only, with reference to the accompanying drawings, in which.

Figure 1:
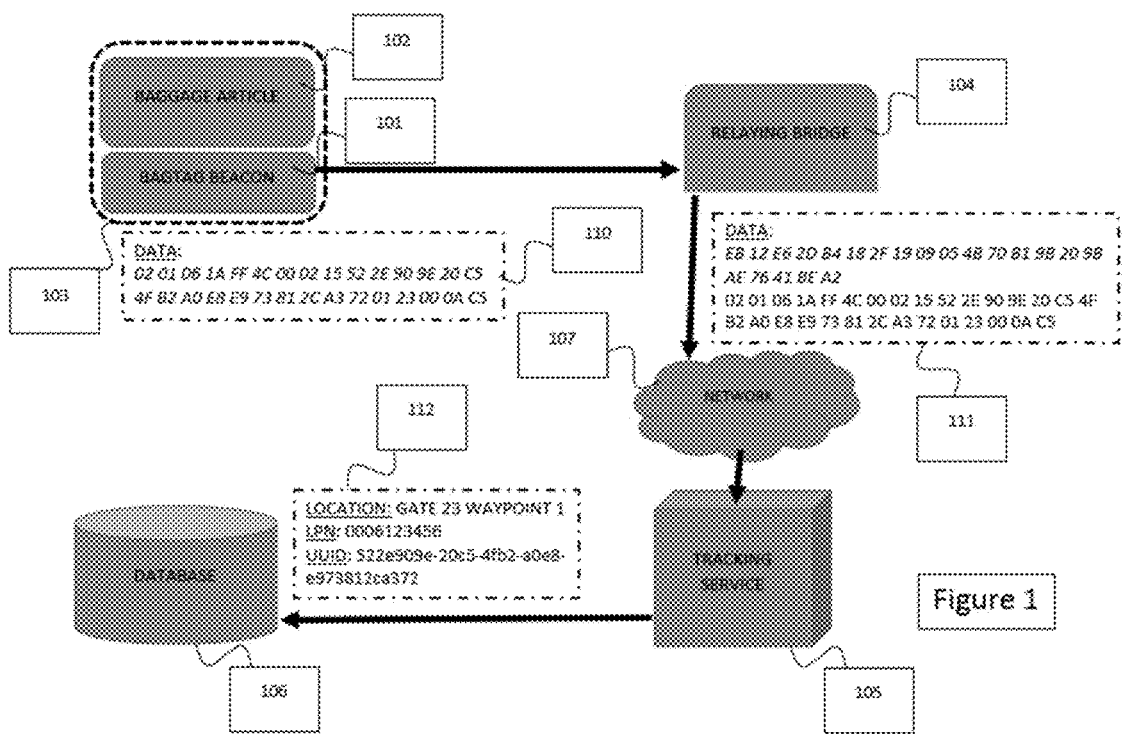
FIG. 1 shows a schematic block diagram of an article tracking system embodying the invention.

Embodiments of the invention described below relate to baggage tracking within the airline and other transportation industries. However, the invention is related generally to tracking an article in any large venue, including, but not limited to, shopping centres, sports stadia, commercial premises, academic institutions and performance venues.

Presently, baggage is tracked in the airline industry using 1-d laser barcode scanners and Baggage Information Messages, which are sent between departure control systems and automated baggage handling systems. The Baggage Information Messages are sent, received and processed by the airport departure and baggage handling systems in order to achieve automated baggage sortation, passenger and baggage reconciliation, and other baggage services.

Baggage information included in the Baggage Information Messages is linked with a unique 10-digit bag tag number defined as the Licence Plate Number (LPN). This 10 digit LPN is a unique reference to a specific baggage article which is issued during check-in. The airport systems receive this 10 digit LPN in a baggage message and store the LPN for use as a reference when communicating to other airport systems.

There are several different types of Baggage Information Messages, including Baggage Source Messages (BSMs) and Baggage Processed Messages (BPMs).

The BSM provides information for processing baggage by automated baggage systems. Generated by an airline Departure Control System, a BSM will be generated when a passenger checks in baggage for a journey, when baggage must be transferred to a different flight, and when baggage has been mishandled.

An example of a BSM in teletype format is shown below. Data contained within the BSM may be sourced from baggage handling systems, or other systems storing passenger information.

| MESSAGE CODE LINE | MESSAGE LINE DESCRIPTION |
|---|---|
| BSM<= | Standard Message Identifier |
| .V/1LZRH<= | Version 1; Local baggage at Zurich Airport (ZRH) |
| .F/SR101/18APR/JFK/F<= | Outbound carrier and flight; Date; Destination; Class |
| .N/0085<u>123456</u>003<= | LPN - IATA airline code; Baggage number (underlined); Number of consecutive tags |
| ENDBSM<= | End of Message Identifier |

In the above example the second line, which begins .V, defines the current location of the baggage, Zurich, and indicates the baggage has originated there.

The third line, which begins .F, defines the itinerary. In this case, a baggage article has been checked onto Swiss Air flight number SR101 to JFK International Airport on 18 April and belongs to a first class passenger. Itinerary data is mandatory in BSMs for originating baggage, as in the above example, and transfer baggage. It is not included for baggage which has reached its terminating location.

In the fourth line, .N indicates the baggage LPN and the number of baggage articles checking in belonging to the same traveller. The $1^{st}$ digit is a leading digit which may be used by individual airlines to aid baggage identification. The $2^{nd}$ to $4^{th}$ digits (085) define a 3-digit IATA airline code. For example, 006 indicates Delta Airlines and 085, the example here, indicates Swiss Air. The $5^{th}$ to $10^{th}$ digits (underlined above) define a 6-digit baggage number associated with the baggage article at check-in. The final 3 digits indicate that 3 articles of baggage were checked in by the passenger. Thus, 3 LPNs are associated with this passenger:

LPN#1=0085123456
LPN#2=0085123457
LPN#3=0085123458.

The 6-digit baggage numbers are generated in sequential order. To prevent different baggage articles being assigned the same LPN, the uniqueness of each LPN is ensured by combining the baggage number with the 3-digit IATA airline code and a customisable leading digit.

BSMs are sent if a baggage article has unexpectedly missed a connection, or conversely, if a passenger has not boarded an aircraft, and that a baggage article is consequently not allowed to travel.

BPMs are sent to communicate when a baggage article has been processed by a baggage handling system. BPMs come in two varieties: sortation messages and reconciliation messages. As before with BSMs, the data contained within a BPM may be sourced from baggage handling systems, or other systems storing passenger information.

BPM sortation messages are sent during various stages of the baggage journey and enable baggage sortation systems to determine whether a baggage article has been correctly sorted. The sortation messages also include screening messages. Baggage screening systems are used by Transport Security Agents (TSAs) to check baggage, and a BPM is generated if the baggage article is approved.

BPM reconciliation messages are confirmation messages sent when a baggage article successfully completes part of the baggage journey. For example, a BPM reconciliation message may be sent when baggage is correctly loaded onto or unloaded from an aircraft.

As described above, an LPN is associated with a baggage article at check-in. However, instead of associating the LPN with a barcode paper bag tag, a system embodying the present invention associates the LPN with a bagtag beacon which emits a data packet including a beacon identifier. In one embodiment, an association between the LPN and beacon identifier is stored during the check-in process and used to locate the baggage article. Alternatively, the LPN may be included in the data packet with the beacon identifier for use in locating the baggage article.

As shown with FIG. 1, an embodiment of the invention includes: a bagtag beacon 101 associated with a baggage article 102 to form a tracked article 103, a relaying bridge 104, a tracking service 105 and a database 106. A beacon is understood to be a device which transmits an identifier to other nearby devices.

The bagtag beacon 101 emits a data packet 110 by short range radio transmission. Each data packet 110 contains a beacon identifier associated with a baggage article and a beacon transmission power indicator. The beacons are selected and calibrated to ensure that the transmission power at a certain range, for example 1 meter, is constant for a given battery strength.

In preferred embodiments, the shortrange radio transmission conforms with the Bluetooth low energy (BLE) protocol.

The number of data packets 110 emitted by the beacon can vary depending on the beacon's mode of operation. In some embodiments, the number of beacon data packets emitted may be between 10 every second and one every 3 seconds.

The relaying bridge 104 converts each detected beacon data packet 110 into a relay data packet 111. Since the beacon data packets 110 are low energy communications they have a relatively short communication range. Converting a beacon data packet 110 for communication over a longer range enables tracking data to be reliably received by the tracking service 105 at a remote location. In one embodiment, the beacon data packet 110 is converted from a Bluetooth signal to a Wi-Fi signal and relayed to the tracking service 105 through a Wi-Fi network 107. The relaying bridge 104 therefore acts as a Wi-Fi bridge between the received shortwave radio beacon data packet 110 and the Wi-Fi relay data packet 111.

A unique relaying bridge identifier is included in the relay data packet 111. The relaying bridge identifier identifies the precise location of the relaying device within the airport facility. The precise location coordinates of the relaying bridge 104 may be established using a GPS location during installation of the bridge. However, if a GPS signal is unavailable the location coordinates or a description of the location may be manually inserted during installation of the relay bridge 104 or alternatively included in an exception table, which can be stored in the database and referenced during analysis. The known location of the relaying bridge 104 may correspond to an important waypoint in the journey of a baggage article through an airport facility.

The relay data packet 111 also includes a received signal strength indicator (RSSI) which is the calculated strength of the data packet when received by the relay bridge. Including the RSSI in the relay data packet 111 allows the tracking service 105 to determine the separation between a beacon 101 and a relaying bridge 104 as further described below.

In one embodiment, the tracking service 105 is cloud based and accessed via a network 107. The tracking service 105 receives the relay data packet 111, timestamps the data and stores the data in a tracking database 106.

As indicated above, in one embodiment the tracking service 105 also stores the association between the beacon identifier and the LPN allocated during check-in. The tracking service may extrapolate passenger and location information from the known beacon and relaying bridge identifiers using a look-up table stored either in the tracking service 105 or the tracking database 106. This information may be analysed to determine the location of the baggage article as further described below.

In accordance with one embodiment, the tracking service 105 may amalgamate received location data into JSON payloads. In an alternative embodiment, the system may also include access points and websockets, also known as aggregators, which perform the functionality of amalgamating the data into JSON payloads. This allows baggage tag vendors to provide data processing services to the tracking service 105. The processed data is then streamed from the websocket to the tracking service 105 for storage and analysis.

Thus, a tracking service 105 identifies when a particular beacon 101 associated with a baggage article 102 is detected by a particular relaying bridge 104 having a known location.

However, accurately tracking a baggage article throughout a baggage journey requires multiple relay bridges positioned at various stages of the journey. As previously discussed, deploying RFID scanners throughout a baggage journey is very expensive, as each RFID scanner costing thousands of dollars each. However, the cost of each relaying bridge is in the order of tens of dollars each. Embodiments of the invention therefore have the advantage that a large number of relaying bridges may be positioned throughout the stages of an article's journey at a much reduced cost compared to known systems. Additionally, positioning many relaying bridges throughout a journey has the advantage of enabling embodiments of the invention to provide more detailed and accurate article tracking information compared to known systems.

Embodiments of the invention using multiple relaying bridges are now described with reference to FIGS. 2 to 4 of the accompanying drawings.

Figure 2:
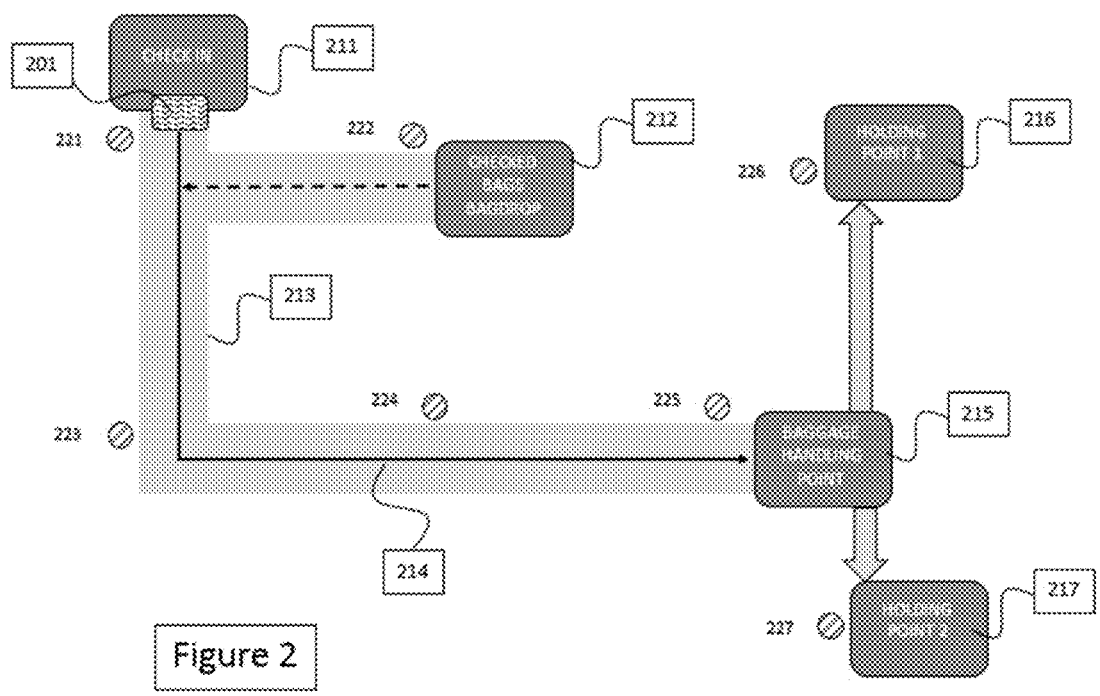
FIG. 2 shows a schematic diagram of an example of a baggage journey within the system of FIG. 1.

FIG. 2 shows various airport infrastructure locations defining points of interest encountered during a baggage journey. The points of interest shown include a check-in desk 211 a checked bag drop point 212, a baggage handling point 215 and baggage holding locations 216, 217. Baggage associated with a bagtag beacon 201 may be checked in at a traditional check-in desk 211 or may be taken to a drop off point 212 if checked in prior to arriving at the airport. Check-in desk 211 and baggage drop point 212 are connected to a baggage handling point 215 by a conveyor belt path 213. Once checked in, the baggage and bagtag beacon travel on a fixed path 214 along the conveyor belt to the baggage handling point 215. Once at the baggage handling point 215, the baggage may be processed further and sent to holding locations 216, 217 to await being loaded onto the correct flight. At any given time there will be a plurality of baggage articles in the system, each article having a beacon attached and each beacon having a unique identifier as described above.

Relaying bridges 221 to 227 may be placed near to the infrastructure points of interest and at intervals along the baggage journey. The relay bridges establish a series of waypoints which the bagtag beacon 201 passes on its way to being loaded onto an aircraft. In another embodiment, relaying bridges are also located outside the airport terminal so that the entirety of a baggage journey may be tracked including before entering and after exiting an airport terminal.

Each relaying bridge will detect a beacon data packet if the relay bridge is within effective beacon communication range. Each detected data packet is relayed to the tracking service in the manner described above. A single beacon data packet may therefore be detected in multiple locations at the same time. In some embodiments, the maximum effective beacon communication range is between 30 m and 50 m. In other embodiments the maximum effective beacon communication range is up to 150 m.

The tracking service 105 gathers and stores article tracking data for each relay bridge 221 to 227 during a specified data gathering time interval. At the end of this data gathering time interval a location algorithm processes the aggregated tracking data to assess to which relay bridge the beacon 201 is closest.

Baggage Tracking Algorithm

A location algorithm tracks the baggage article's location using the received signal strength indicator (RSSI) included within each relay data packet 111 received during a data gathering time interval.

In one embodiment, the algorithm directly compares an average of the RSSI for each of the relay bridges that detects the beacon data packet. As the detected intensity or power of the beacon data packet obeys an inverse-square law, establishing which relay bridge records the strongest RSSI also establishes which relay bridge is closest to the baggage article.

Figure 3:
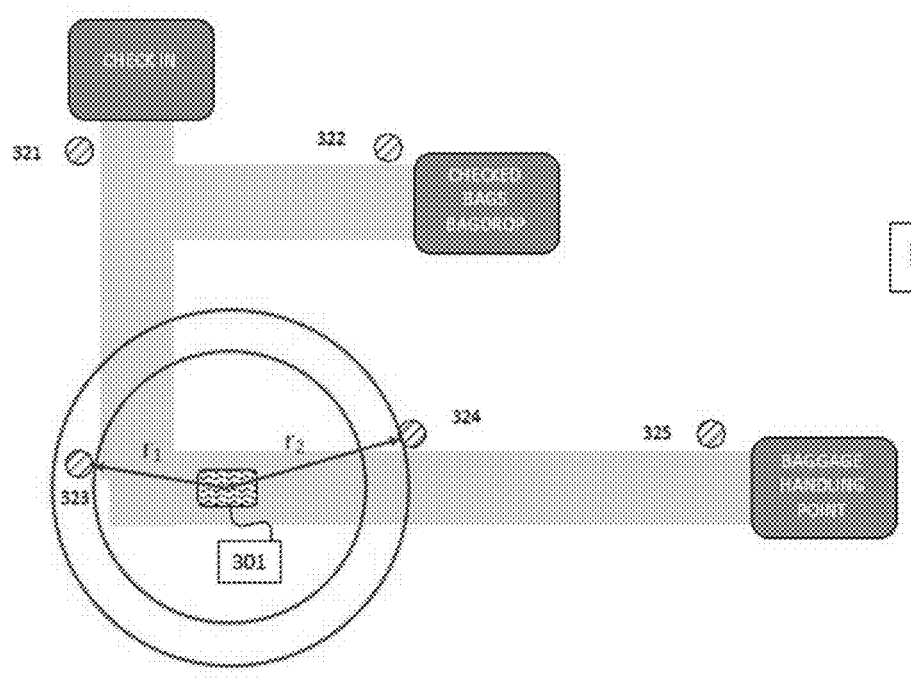
FIG. 3 shows one example of how a baggage article may be tracked.
Figure 4:
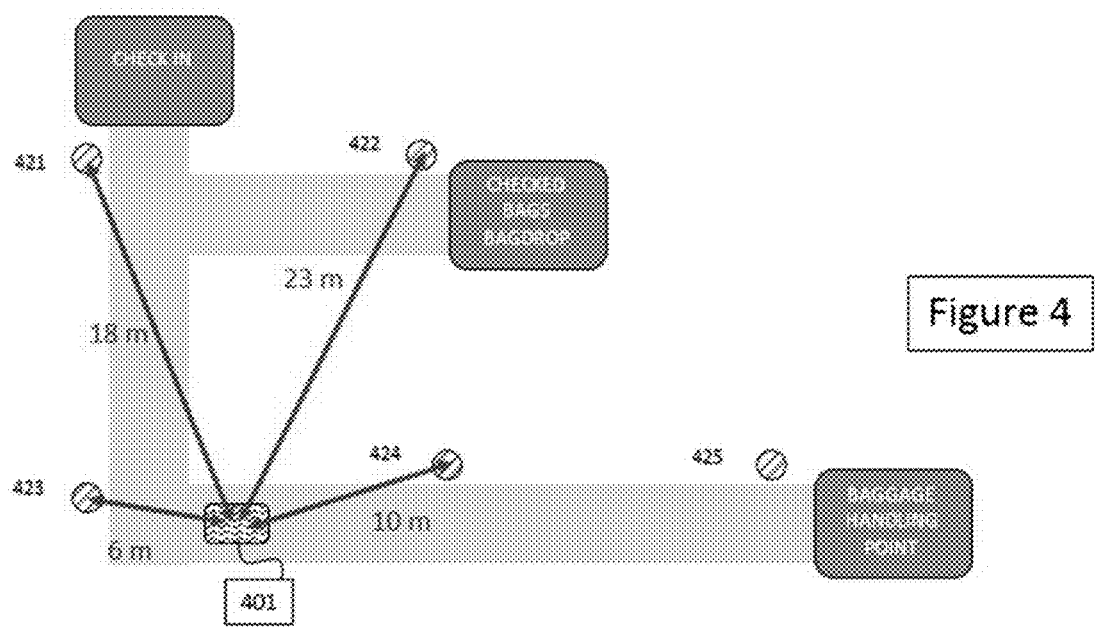
FIG. 4 shows an alternative example of how a baggage article may be tracked.

Referring to FIG. 3, relay bridges 323 and 324 both detect a data packet emitted by beacon 301 nearby. The tracking service (not shown) is able to identify which of r_1 and r_2 is the smallest by directly comparing the average detected beacon power for relay bridges 323 and 324. In free space, the power of a propagating electromagnetic signal is inversely proportional to the square of the distance the signal has travelled. Therefore, a larger average detected beacon power measured by a particular relay bridge will correspond to a smaller distance between the beacon 301 and that relay bridge. In FIG. 3, relay bridge 323 records a higher detected beacon power than relay bridge 324. The tracking service can therefore establish that the baggage article is closer to bridge 323. When the tracked baggage article follows a fixed path 214, the location of the baggage article may be established to within half the separation of the two closest relay bridges.

Alternatively, the algorithm may track the baggage article location by calculating an approximate distance between the beacon and each relay bridge. As shown in FIG. 4, relay bridges 421, 422, 423 and 424 all detect a data packet emitted by a beacon 401. A tracking service (not shown) stores tracking data for each of relay bridges 421, 422, 423 and 424.

As described above, a beacon transmission power indicator is included in beacon data packet 110. A relay bridge 423 calculates and includes a RSSI in the relay data packet 111. The tracking service may use an algorithm to calculate the separation between the beacon 401 and the relay bridge 423 using the beacon transmission power and RSSI as further described below.

The algorithm is able to establish at what time the baggage article associated with the beacon 401 arrives at a particular relay bridge associated with a point of interest in the baggage journey. For example, analysing data from a single relay bridge over an extended period of time may show the calculated separation distance reaches a minimum. The timestamp associated with the minimum separation distance may be used as the time the baggage passed the relay point or, in other words, arrives at a point of interest on the baggage journey. Alternatively, the algorithm may determine the baggage article arrives at a point of interest when the calculated separation between the beacon and the relay bridge associated with the point of interest falls below an acceptable threshold.

In an alternative embodiment, the location algorithm may use a combination of the above approaches.

In a specific embodiment, a known data set is used to derive a distance from the beacon to the relay bridge. An example algorithm for calculating the predicted distance is shown below.

```
if (rssi == 0) {
    return -1.0; // if we cannot determine accuracy, return -1.
}
double ratio = rssi * 1.0 / txPower;
if (ratio < 1.0) {
    return Math.pow(ratio, 10);
} else {
    double accuracy = (0.89976) * Math.pow(ratio, 7.7095) + 0.111; //
    // original from android library
    // double accuracy = (0.79976) * Math.pow(ratio, 5.3095) + 0.111;
    return accuracy;
}
```

The above algorithm uses a mathematical equation for calculating a predicted distance, also known as an accuracy, between a relay bridge and a beacon using the received signal strength indicator (RSSI) and a known table of distance/RSSI values for a specific device. In the above algorithm, the equation used is:

$$d = A\left(\frac{r}{t}\right)^B + C$$

where d is the distance in meters, r is the RSSI measured by the relay bridge and t is the reference transmission power measured 1 meter from the beacon. A, B, and C are constants which vary by device. In the example algorithm above, one set of constant values A, B and C are 0.89976, 7.7095 and 0.111 respectively. An alternative set of constant values A, B and C are 0.79976, 5.3095 and 0.111 respectively.

Constants A and B of the equation above are determined by calculating the power function that best fits a set of distance/RSSI values. Suitable methods may include a least-squares fitting calculation. The constant C is determined by calibrating the calculated distance at 1 m from the relay bridge.

In one embodiment, the known table of distance/RSSI values is created using 20 RSSI measurements taken at the following distances in meters: 0.25, 0.5, 1, 2, 3, 4, 5, 6, 7, 8, 9, 10, 12, 14, 16, 18, 20, 25, 30, and 40.

Table 1 below shows an example data set where the reference RSSI at one meter, t, is −51 dBm. Performing a least-squares fitting calculation on the data in table 1, constant A has a value of 1.203420305, and constant B has a value of 6.170094565.

TABLE 1

| Distance (m) | RSSI (dBm) | Ratio, r/t |
| --- | --- | --- |
| 0.25 | −41 | 0.8039215686 |
| 0.5 | −43 | 0.8431372549 |
| 1 | −49 | 0.9607843137 |

TABLE 1-continued

| Distance (m) | RSSI (dBm) | Ratio, r/t |
|---|---|---|
| 2 | −65 | 1.274509804 |
| 3 | −58 | 1.137254902 |
| 4 | −57 | 1.117647059 |
| 5 | −67 | 1.31372549 |
| 6 | −67 | 1.31372549 |
| 7 | −77 | 1.509803922 |
| 8 | −70 | 1.37254902 |
| 9 | −69 | 1.352941176 |
| 10 | −75 | 1.470588235 |
| 12 | −72 | 1.411764706 |
| 14 | −72 | 1.411764706 |
| 16 | −78 | 1.529411765 |
| 18 | −83 | 1.62745098 |
| 20 | −81 | 1.588235294 |
| 25 | −81 | 1.588235294 |
| 30 | −75 | 1.470588235 |
| 40 | −83 | 1.62745098 |

Constant C is determined by using constants A and B to calculate predicted distances for each distance/RSSI value and calibrating the results at 1 m. As shown in table 2 below, in this specific example, constant C has a value of 0.05980590499.

TABLE 2

| Distance (m) | RSSI (dBm) | Ratio (r/t) | Predicted Distance (m) | Calibrated predicted Distance (m) |
|---|---|---|---|---|
| 0.25 | −41 | 0.8039215686 | 0.3130233831 | 0.3728292881 |
| 0.5 | −43 | 0.8431372549 | 0.419954957 | 0.479760862 |
| 1 | −49 | 0.9607843137 | 0.940194095 | 1 |
| 2 | −65 | 1.274509804 | 5.375201146 | 5.435007051 |
| 3 | −58 | 1.137254902 | 2.661125465 | 2.72093137 |
| 4 | −57 | 1.117647059 | 2.390351541 | 2.450157446 |
| 5 | −67 | 1.31372549 | 6.480404091 | 6.540209996 |
| 6 | −67 | 1.31372549 | 6.480404091 | 6.540209996 |
| 7 | −77 | 1.509803922 | 15.28882263 | 15.34862854 |
| 8 | −70 | 1.37254902 | 8.491360137 | 8.551166042 |
| 9 | −69 | 1.352941176 | 7.76999345 | 7.829799355 |
| 10 | −75 | 1.470588235 | 12.99730117 | 13.05710707 |
| 12 | −72 | 1.411764706 | 10.10334106 | 10.16314696 |
| 14 | −72 | 1.411764706 | 10.10334106 | 10.16314696 |
| 16 | −78 | 1.529411765 | 16.5558124 | 16.6156183 |
| 18 | −83 | 1.62745098 | 24.29076428 | 24.35057019 |
| 20 | −81 | 1.588235294 | 20.89685429 | 20.95666019 |
| 25 | −81 | 1.588235294 | 20.89685429 | 20.95666019 |
| 30 | −75 | 1.470588235 | 12.99730117 | 13.05710707 |
| 40 | −83 | 1.62745098 | 24.29076428 | 24.35057019 |

As may be seen from the final column of table 2, in this alternative embodiment the calculated predicted distance is not very accurate but has the advantage of being able to effectively establish which relay bridge a particular beacon is nearest to.

Figure 5:
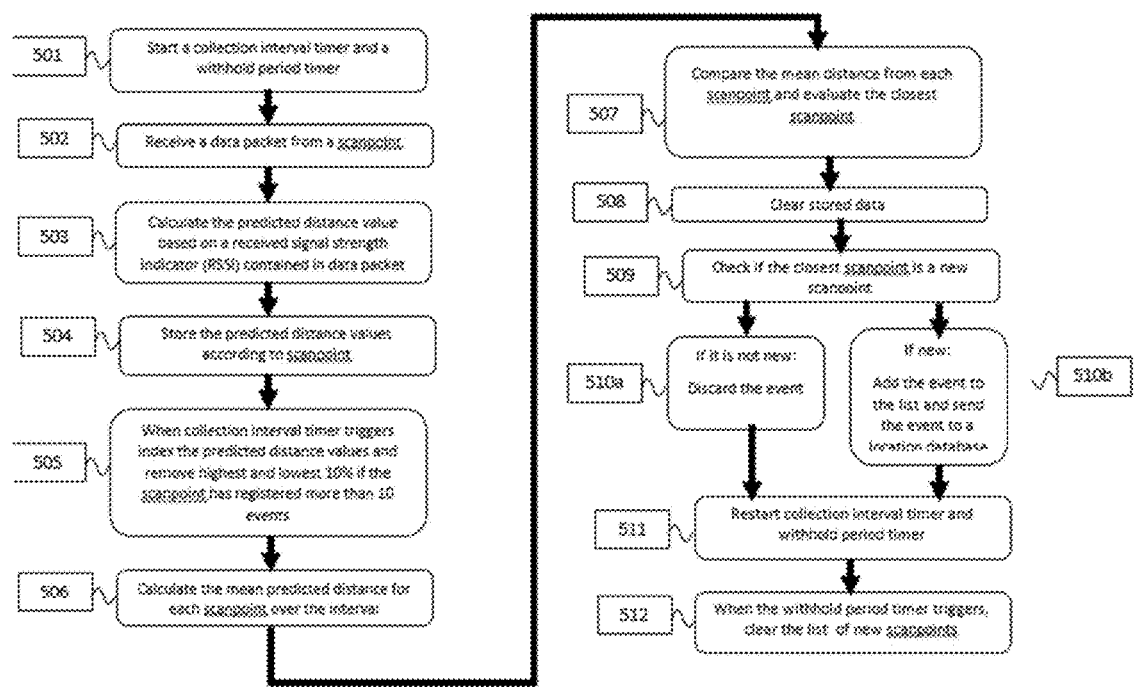
FIG. 5 shows a flow diagram of an example process for tracking a baggage article.

A specific embodiment of how the predicted distance calculations may be executed and stored are further described below with reference to FIG. 5.

In a first step 501, a collection interval and/or a withhold period timer are set. The collection interval is defined as the amount of time to cache events before calculating the closest relay bridge. The collection interval in some embodiments may be 10 seconds. The withhold time is defined as the amount of time to withhold writing a relay bridge-specific presence event to the tracking database.

During the collection interval, data packets are received from different scanpoints in step 502. The tracking service calculates a predicted distance, also known as an accuracy, based on the RSSI contained in each relay bridge data packet 111 received in step 503. The calculated result is bundled into an AccuracyEvent object, and saved in an object called AccuracyEventByScanpoint which manages a collection interval map of arrays for a particular relay bridge, or scanpoint. In other words, all the detected accuracy events for a particular scanpoint or relay bridge are represented as its own managed container called AccuracyEventByScanpoint in step 504.

Tracking data is stored in AccuracyEventByScanpoint throughout the collection interval time. When the collection interval timer triggers in step 505, it asks an AccuracyInterval object to calculate the last interval by calling each AccuracyEventByScanpoint container to calculate the predicted distance for this scanpoint over the interval, based on the predicted distances stored in the accumulated AccuracyEvents during the collection period. The AccuracyEventByScanpoint iterates through the list of events, determining which indexes in the list represent the lowest and highest distance values. The AccuracyEventByScanpoint then iterates through the list again, adding the distance measurements together. If the number of events is greater than 10, it filters out the highest and lowest 10% predicted distance values. In step 506, the total distance figure is divided by the number of events to obtain the mean distance between a detected beacon and that relay bridge.

In step 507, the AccuracyInterval calculates the closest scanpoint from the list of distances returned by all of the participating AccuracyEventByScanpoint containers and returns an event including the closest scanpoint. At this point, the AccuracyInterval container, and hence all of the AccuracyEventByScanpoint containers, are cleared in step 508.

A list called ScanpointsDetectedSinceLastWithholdTime is checked in step 509. This list holds the scanpoints that have been flagged at some point in the withhold time period, to have been the closest to the beacon and thus have had an event written to the database containing the tracking data in the relay bridge data packet. If the scanpoint is on the list, the event is discarded in step 510a. If not, an event is written to the database in step 510b, and the scanpoint added to the list.

Both collection interval and withhold period timers are now checked to see whether they are running. If not, they are started in step 511. When the withhold timer triggers, it clears the ScanpointsDetectedSinceLastWithholdTime list in step 512.

Therefore, in the above embodiment the algorithm gathers data for each detected beacon over a collection interval, calculates the average distance from each relay device to each beacon and stores a record of the nearest relay device to each beacon.

Use of the Tracking Data

Once the location algorithm has established the baggage article arrives at a new point of interest on the baggage journey, the associated time stamp corresponding to an arrival time is also stored in the database.

Once written to the tracking database, the well-known concept of shadowing may be used to accumulate all the tracking data associated with a beacon.

A beacon 'shadow' is a software copy of the physical beacon containing a store of all historical data associated with the beacon. The shadow may be stored in a cloud-based database and persists even if the system software crashes. The shadow can be replicated for use across different operating systems or hubs. The shadow may be queried to identify a particular beacon and can return any historical data concerning the baggage article associated with that beacon, including a UUID and LPN.

The shadow therefore contains a full history of the baggage article's tracked location. The location tracking system can therefore interrogate the shadow, extract the stored tracking data associated with a baggage article and present the data to a user in a meaningful way, as further described below with regard to FIG. 6.

Figure 6:
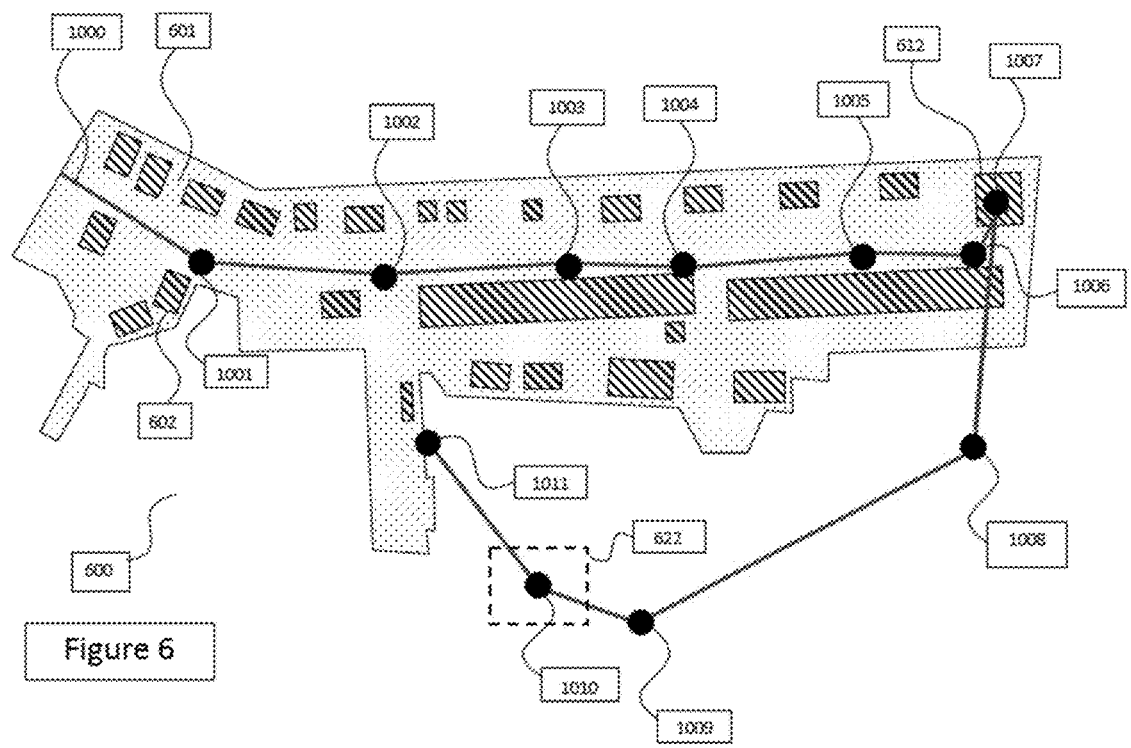
FIG. 6 shows an example tracked route taken by a baggage article through an airport.

FIG. 6 shows how the tracking data may be presented on an airport terminal map 600 to show the passage of a baggage article 1000 along a number of waypoints 1001 to 1011 within the airport terminal 601.

A baggage journey will consist of a pre-check-in phase, during which a baggage article travels through the airport terminal 601 to a check-in desk or other baggage drop-off point, and a post-check-in phase, during which a baggage article follows a pre-determined path according to the baggage handling systems of the airport.

In the example shown, the location of the baggage article during each of these phases may be tracked according to waypoints 1001 to 1011. These waypoints correspond to familiar landmarks or locations in close vicinity to a relaying bridge. Familiar landmarks or locations will typically correspond to infrastructure features of the airport terminal and are shown in FIG. 6 as cross-hatched boxes. For simplicity, only three landmarks 602, 612, 622 are labelled.

Examples of familiar landmarks for use as a waypoint are one of the numerous vendor stalls or airport offices 602 located within the terminal, an airline check-in desk 612, or an airline baggage handling holding area 622. Each of these landmarks will be familiar to one or more of travellers, airport staff and baggage handlers.

As described above, a descriptor corresponding to the waypoint location can be assigned to each relaying bridge to aid identification of the waypoint location. For example, a relay bridge associated with waypoint 612 may be assigned the descriptor "Swiss Air Check-In Desk" and another relay bridge associated with waypoint 622 may be assigned the descriptor "Swiss Air Baggage Holding Area."

In one embodiment, the tracking data is plotted on an airport terminal map 600 when the location algorithm calculates that the baggage article arrives at a new waypoint. The tracking data can include the waypoint descriptor and the baggage time of arrival.

Alternatively, the location algorithm can populate a table. Table 4 below represents the example baggage journey shown in FIG. 6.

TABLE 4

| LPN | Waypoint Number | Waypoint Descriptor | Event Time |
| --- | --- | --- | --- |
| 0085123456 | 1001 | Concourse J - waypoint 1 | 09:04:35 |
| 0085123456 | 1002 | Concourse J - waypoint 2 | 09:05:11 |
| 0085123456 | 1003 | Concourse J - waypoint 3 | 09:06:02 |
| 0085123456 | 1004 | Concourse J - waypoint 4 | 09:07:04 |
| 0085123456 | 1005 | Concourse J - waypoint 5 | 09:07:38 |
| 0085123456 | 1006 | Concourse J - waypoint 6 | 09:08:15 |
| 0085123456 | 1007 | Swiss Air Check-In Desk | 09:34:36 |
| 0085123456 | 1008 | Baggage Track 001 | 09:36:05 |
| 0085123456 | 1009 | Baggage Track 002 | 09:39:09 |
| 0085123456 | 1010 | Swiss Air Baggage Holding Area | 09:39:51 |
| 0085123456 | 1011 | Departure Gate H4 | 11:34:07 |

An article of baggage belonging to a traveller may be therefore tracked through an airport terminal 601 as follows.

As a traveller walks through the airport terminal 601, data packets emitted by a beacon associated with the traveller's article of baggage are detected by one or more nearby relaying bridges. The baggage article passes nearby 6 relaying bridges associated with waypoints 1001 to 1006 during the pre-check-in phase of the baggage journey. The baggage article is checked-in at waypoint 1007 and passes nearby 3 relaying bridges associated with waypoints 1008, 1009 and 1010 during the post-check-in phase of the baggage journey. The baggage is retained in the holding area 622 until the bag is loaded onto the aircraft at waypoint 1011. During the baggage journey, a tracking service accumulates baggage tracking data and calculates the time at which the baggage article passes each waypoint, as described above.

In an embodiment, a mobile application may send a notification to a passenger when a baggage article arrives at a specific location. For example, a notification may be sent when the baggage arrives at a holding area to await being loaded onto an aircraft. The notification may include information relating to the baggage article's location and the time of arrival at that location. The notification may also include other information such as passenger details, the flight number and final destination.

In the air transport industry, there is a well measured anxiety about the possibility of checked baggage being lost, stolen, delayed, or damaged. Although these eventualities are rare, passengers remain unaware of the precise location and status of their baggage throughout much of their journey. Embodiments of the invention therefore have the advantage of reassuring passengers that their baggage has been processed properly by sending baggage status notifications to a passenger through a mobile application.

In another embodiment, the tracking service generates and sends a BPM based on the received location data and passenger related data sourced from baggage handling systems or other systems storing passenger information before storing the location data in the database. Sending BPMs to baggage handling systems enables embodiments of the invention to effectively communicate data associated with tracking a baggage article to existing systems. BPMs containing baggage location and tracking data may be sent to baggage handling systems with reference to the following example.

A bagtag beacon emits the following data packet 110 shown as an example in FIG. 1:

E7 F7 77 B9 29 B3 02 01 06 1A FF 4C 00 02 15 52 2E 90 9E 20 C5 4F B2 A0 E8 E9 73 81 2C A3 72 01 23 00 0A C5

The data packet 110 comprises a combination of identifying elements listed in table 5 below.

TABLE 5

| MAC Address | E7 F7 77 B9 29 B3 |
| --- | --- |
| Device protocol-specific prefix | 02 01 06 1A FF 4C 00 02 15 |
| Device UUID | 52 2E 90 9E 20 C5 4F B2 A0 E8 E9 73 81 2C A3 72 |
| Major identifier | 01 23 |
| Minor identifier | 00 0A |
| Beacon transmission power | C5 |

The data packet may be enriched with data by the relaying bridge and is either translated to JSON format before being sent to the tracking service. Alternatively, the data packet is sent to an aggregation service for translation to JSON format. The aggregation service subsequently streams the enriched data to the tracking service.

In the example shown in FIG. 1, the relaying bridge enriches data packet 110 with the following additional data in data packet 111:

EB 12 E6 2D B4 18 2F 19 09 05 4B 70 B1 9B 20 9B AE 76 41 BE A2

The additional data included in data packet 111 comprises a combination of identifying elements listed in table 6 below.

TABLE 6

| | |
|---|---|
| Device indicator prefix | EB 12 E6 2D |
| Relay Device UUID | B4 18 2F 19 09 05 4B 70 B1 9B 20 9B AE 76 41 BE |
| Received Signal Strength Indicator (RSSI) | A2 |

An example of an enriched data packet in JSON format received by the tracking service is shown below.

```
{
    "packetType": "iBeacon",
    "timestamp": "2017-04-18T17:09:28.049Z",
    "scanpointId": " b4182f19-0905-4b70-b19b-209bae7641be",
    "version": "1",
    "macAddress": "e7:f7:77:b9:29:b3",
    "uuid": "522e909e-20c5-4fb2-a0e8-e973812ca372",
    "major": 0123,
    "minor": 000A,
    "measuredPower": -59,
    "rssi": -94
}
```

In the above example, "packetType" defines the data packet source protocol by identifying the protocol-specific prefix. In this example, the data packet is identified as an iBeacon payload. "timestamp" defines the time the relaying bridge receives a data packet.

"scanpointID" defines the relaying bridge identifier and is used by the tracking service to attribute a known location and associated attributes of the location to the event. In the above example, the scanpointID is a UUID which is associated with a scanpointID descriptor. For the above scanpointID, the scanpointID descriptor is '684'. The association between a scanpointID and a scanpointID descriptor may be stored and referenced when generating a BPM. "version" is an optional element which defines the version number of the data packet layout. "macAddress" in this example is the beacon device's unique MAC address. "uuid" is the unique device identifier as described above. "major" and "minor" are configurable elements in the device data packet. "measuredPower" is equivalent to the beacon transmission power in table 3 and defines the constant received signal strength of the device at 1 meter measured in dBm. "rssi" defines the received signal strength calculated by the relaying bridge.

In the example data packets 110 and 111 shown above, RSSI and beacon transmission power are both represented as hexadecimal values. As both the RSSI and beacon transmission power are negative dBm values, the conversion between decimal values and hexadecimal values involves the well-known use of a two's complement operation.

The tracking service uses the UUID and scanpointID data to identify information associated with the UUID and scanpointID, such as the LPN and baggage location. An example BPM generated from the above JSON data packet is shown below.

| MESSAGE CODE LINE | MESSAGE LINE DESCRIPTION |
|---|---|
| BPM<≡ | Standard Message Identifier |
| .V/1LMIA<≡ | Version 1; Local baggage at Miami Airport (MIA) |
| .J/S//684/18APR/120928L<≡ | Processing information: secondary code; scanpointID descriptor, date and local time |
| .F/US101/18APR/JFK/F<≡ | Outbound carrier and flight; Date; Destination; Class |
| .N/0001100252<≡ | LPN - IATA airline code plus baggage number; Number of consecutive tags |
| ENDBPM<≡ | End of Message Identifier |

The second line of the above example, which begins .V, defines the current location of the baggage, Miami, and indicates the baggage has originated there.

The third line, beginning .J, defines processing information for the baggage. In this case, the processing information relates to the baggage location and includes the scanpointID descriptor of the closest relaying bridge, as well as the date and time the baggage article arrived at that relaying bridge.

The fourth line, which begins .F, defines the itinerary. In this case, a baggage article has been checked onto US Airways flight number US101 to JFK International Airport on 18 April and belongs to a first class passenger. Itinerary data is mandatory in BPMs when used as part of a reconciliation or sortation process.

In the fifth line, .N indicates the baggage LPN which is associated with the UUID contained in the data packet.

The above embodiment therefore has the advantage of integrating into existing baggage handling systems while providing improved baggage tracking data.

The above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure.

The invention claimed is:

1. An article tracking system comprising:
   a. a beacon associated with an article for emitting a plurality of short-range radio signals, each short-range radio signal including a beacon identifier and a beacon transmission power;
   b. a plurality of relaying devices having known locations each for detecting the short-range radio signals, calculating a received signal strength indicator (RSSI) for each detected short-range radio signal, converting each detected short-range radio signal to a relay signal, and transmitting each of the relay signals, the relay signals including a unique relaying device identifier and RSSI information;

c. timestamping means for attaching a time stamp to each relay signal; and d. a tracking device for continually receiving the relay signals from each relaying device, comparing a characteristic of the received relay signals from each relaying device to determine to which of the plurality of relaying devices the beacon is closest, and storing the time stamp, beacon identifier and unique relaying device identifier of the determined closest relaying device, wherein the characteristic of the received relaying signals from each relaying device includes a calculated RSSI, and wherein the tracking device determines to which of the plurality of relaying devices a beacon is closest based on a comparison of an average calculated RSSI for a plurality of relay signals associated with each relaying device.

2. The article tracking system of claim 1, wherein the beacon is associated with the article by attaching the beacon to the article.

3. The article tracking system of claim 1, wherein the beacon identifier includes a unique user identification number (UUID).

4. The article tracking system of claim 1, wherein the beacon identifier is associated with a baggage licence plate number (LPN).

5. The article tracking system of claim 1, wherein the beacon identifier is associated with a baggage licence plate number (LPN) by including the LPN in the beacon identifier.

6. The article tracking system of claim 1, wherein the timestamping means attaches a time stamp to a relay signal before the tracking device receives the relay signal.

7. The article tracking system of claim 1, wherein the timestamping means attaches a time stamp to a relay signal after the tracking device receives the relay signal.

8. An article tracking system comprising:
a. a beacon associated with an article for emitting a plurality of short-range radio signals, each short-range radio signal including a beacon identifier and a beacon transmission power;
b. a plurality of relaying devices having known locations each for detecting the short-range radio signals, calculating received signal strength indicator (RSSI) for each detected short-range radio signal, converting each detected short-range radio signal toa a relay signal, and transmitting each of the relay signals, the relay signals including a unique relaying device identifier and RSSI information;
c. timestamping means for attaching a time stamp to each relay signal, and
d. a tracking device for continually receiving the relay signals from each relaying device, comparing a characteristic of the received relay signals from each relaying device to determine to which of the plurality of relaying devices the beacon is closest, and storing the time stamp, beacon identifier and unique relaying device identifier of the determined closest relaying device; wherein the characteristic of the received relaying signals from each relaying device includes a calculated RSSI and a beacon transmission power; and wherein the tracking device determines to which of the plurality of relaying devices the beacon is closest based on an average ratio of calculated RSSI to beacon transmission power for a plurality of relay signals associated with each relaying device.

9. An article tracking system comprising:
a. a beacon associated with an article for emitting a plurality of short-range radio signals, each short-range radio signal including a beacon identifier and a beacon transmission power;
b. a plurality of relaying devices having known locations each for detecting the short-range radio signals, calculating a received signal strength indicator (RSSI) for each detected short-range radio signal, converting each detected short-range radio signal to a relay signal, and transmitting each of the relay signals, the relay signals including a unique relaying device identifier and RSSI information;
c. timestamping means for attaching a time stamp to each relay signal, and
d. a tracking device for continually receiving the relay signals from each relaying device, comparing a characteristic of the received relay signals from each relaying device to determine to which of the plurality of relaying devices the beacon is closest, and storing the time stamp, beacon identifier and unique relaying device identifier of the determined closest relaying device, wherein the characteristic of the received relay signals from each relaying device includes a calculated average distance between the beacon and each relaying device, and wherein the calculated average distance between the beacon and each of the relaying devices is based on the calculated RSSI and an inverse square law for a plurality of relay signals associated with each relaying device.

10. An article tracking system comprising:
a. a beacon associated with an article for emitting a plurality of short-range radio signals, each short-range radio signal including a beacon identifier and a beacon transmission power;
b. a plurality of relaying devices having known locations each for detecting the short-range radio signals, calculating a received signal strength indicator (RSSI) for each detected short-range radio signal, converting each detected short-range radio signal to a relay signal, and transmitting each of the relay signals, the relay signals including unique relaying device identifier and RSSI information;
c. timestamping means for attaching a time stamp to each relay signal; and
d. a tracking device for continually receiving the relay signals from each relaying device, comparing a characteristic of the received relay signals from each relaying device to determine to which of the plurality of relaying devices the beacon is closest, and storing the time stamp, beacon identifier and unique relaying device identifier of the determined closest relaying device, wherein the calculated average distance between the beacon and each of the relaying devices is based on a known power function of the average ratio of calculated RSSI to beacon transmission power of the relay signals for a plurality of relay signals associated with each relaying device.

11. The article tracking system of claim 9, wherein the tracking device determines to which of the plurality of relaying devices the beacon is closest based on an average calculated distance between the beacon and each of the relaying devices.

12. An article tracking system comprising:
a. a beacon associated with an article for emitting a plurality of short-range radio signals, each short-range radio signal including a beacon identifier and a beacon transmission power;
b. a plurality of relaying devices having known locations each for detecting the short-range radio signals, calculating a received signal strength indicator (RSSI) for each detected short-range radio signal, converting each detected short-range radio signal to a relay signal, and transmitting each of the relay signals, the relay signals including a unique relaying device identifier and RSSI information;
c. timestamping means for attaching a time stamp to each relay signal; and
d. a tracking device for continually receiving the relay signals from each relaying device, comparing a characteristic of the received relay signals from each relaying device to determine to which of the plurality of relaying devices the beacon is closest, and storing the time stamp, beacon identifier and unique relaying device identifier of the determined closest relaying device, wherein the tracking device sends a message including the stored time, beacon identifier and unique relaying device identifier to an external data processing system, and wherein the tracking device sends a message including passenger related information received from an external database to an external data processing system.

13. The article tracking system of claim 1, wherein a plurality of beacons are each associated with an article.

14. The article tracking system of claim 12, wherein the characteristic of the received relay signals from each relaying device includes a beacon identifier.

15. The article tracking system of claim 1, further comprising an aggregator for aggregating relaying device messages and streaming the aggregated messages to the tracking device.

16. The article tracking system of claim 1, further comprising the tracking device configured to determine a time of arrival for the article at a particular relaying device having a known location based on the time the article is located within an acceptable distance from the particular relaying device.

17. The article tracking system of claim 1, further comprising a mobile application for sending the beacon identifier and the article identifier to the tracking device.

18. The article tracking system of claim 1, further comprising a mobile application for displaying the journey of the article to a user.

19. The article tracking system of claim 1, further comprising a mobile application for notifying a passenger or user when the article arrives at a particular relaying device having a known location.

20. An article tracking method comprising the steps of:
a. associating a beacon with an article, the beacon emitting a plurality of short-range radio signals, each short-range radio signal including a beacon identifier and a beacon transmission power;
b. detecting the short-range radio signals at a plurality of relaying devices, calculating a received signal strength indicator (RSSI) for each detected short-range radio signal, converting each short-range radio signal to a relay signal at a plurality of relaying devices having known locations, and transmitting each of the relay signals including a unique relaying device identifier and RSSI information;
c. attaching a time stamp to each relay signal;
d. receiving a plurality of relay signals from the relay devices at a tracking device, comparing a characteristic of the received relay signals from each relaying device to determine to which of the plurality of relaying devices the beacon is closest, and storing the time stamp, beacon identifier and unique relaying device identifier of the determined closest relaying device; and
e. repeating step d thereby to determine multiple locations of the article over time, wherein comparing a characteristic of the received relay signals from each relaying device is based on a calculated RSSI, and wherein determining to which of the plurality of relaying devices a beacon is closest is based on a comparison of an average calculated RSSI for a plurality of relay signals associated with each relaying device.

21. The article tracking method of claim 20, wherein associating the beacon with the article comprises attaching the beacon to the article.

22. The article tracking method of claim 20, wherein attaching the time stamp to each relay signal occurs before receiving the relay signals at the tracking device.

23. The article tracking method of claim 20, wherein attaching the time stamp to each relay signal occurs after receiving the relay signals at the tracking device.

24. An article tracking method comprising the steps of:
a. associating a beacon with an article, the beacon emitting a plurality of short-range radio signals, each short-range radio signal including a beacon identifier and a beacon transmission power;
b. detecting the short-range radio signals at a plurality of relaying devices, calculating a received signal strength indicator (RSSI) for each detected short-range radio signal, converting each short-range radio signal to a relay signal at a plurality of relaying devices having known locations, and transmitting each of the relay signals including a unique relaying device identifier and RSSI information;
c. attaching a time stamp to each relay signal;
d. receiving a plurality of relay signals from the relay devices at a tracking device, comparing a characteristic of the received relay signals from each relaying device to determine to which of the plurality of relaying devices the beacon is closest, and storing the time stamp, beacon identifier and unique relaying device identifier of the determined closest relaying device; and
e. repeating step d thereby to determine multiple locations of the article over time, wherein comparing a characteristic of the received relaying signals from each relaying device is based on a calculated RSSI and a beacon transmission power, and wherein determining to which of the plurality of relaying devices a beacon is closest is based on a comparison of an average ration of calculated RSSI to beacon transmission power for a plurality of relay signals associated with each relaying device.

25. An article tracking method comprising the steps of:
a. associating a beacon with an article, the beacon emitting a plurality of short-range radio signals, each short-range radio signal including a beacon identifier and a beacon transmission power;
b. detecting the short-range radio signals at a plurality of relaying devices, calculating a received signal strength indicator (RSSI) for each detected short-range radio signal, converting each short-range radio signal to a relay signal at a plurality of relaying devices having known locations, and transmitting each of the relay signals including a unique relaying device identifier and RSSI information;

c. attaching a time stamp to each relay signal;

d. receiving a plurality of relay signals from the relay devices at a tracking device, comparing a characteristic of the received relay signals from each relaying device to determine to which of the plurality of relaying devices the beacon is closest, and storing the time stamp, beacon identifier and unique relaying device identifier of the determined closest relaying device; and e. repeating step d thereby to determine multiple locations of the article over time, wherein comparing a characteristic of the received relaying signals from each relaying device is based on a calculated average distance between the beacon and each relaying device, and wherein calculating the average distance between the beacon and each of the relaying devices is based on the calculated RSSI and an inverse square law for a plurality of relay signals associated with each relaying device.

26. An article tracking method comprising the steps of:

a. associating a beacon with an article, the beacon emitting a plurality of short-range radio signals, each short-range radio signal including a beacon identifier and a beacon transmission power;

b. detecting the short-range radio signals at a plurality of relaying devices, calculating a received signal strength indicator (RSSI) for each detected short-range radio signal, converting each short-range radio signal to a relay signal at a plurality of relaying devices having known locations, and transmitting each of the relay signals including a unique relaying device identifier and RSSI information;

c. attaching a time stamp to each relay signal;

d. receiving a plurality of relay signals from the relay devices at a tracking device; comparing a characteristic of the received relay signals from each relaying device to determine to which of the plurality of relaying devices the beacon is closest, and storing the time stamp, beacon identifier and unique relaying device identifier of the determined closest relaying device; and e. repeating step d thereby to determine multiple locations of the article over time, wherein comparing a characteristic of the received relaying signals from each relaying device is based on a calculated average distance between the beacon and each relaying device, and, wherein calculating the average distance between the beacon and each of the relaying devices is based on a known power function of the average ratio of calculated RSSI to beacon transmission power of the relay signals for a plurality of relay signals associated with each relaying device.

27. The article tracking method of claim 25, wherein the tracking device determines to which of the plurality of relaying devices the beacon is closest based on an average calculated distance between the beacon and each of the relaying devices.

28. The article tracking method of claim 20, further comprising associating each of a plurality of beacons with an article.

29. The article tracking method of claim 28, wherein comparing the characteristic of the received relay signals from each relaying device includes comparing a beacon identifier.

30. The article tracking method of claim 20, further comprising sending a message including the stored time, beacon identifier and unique relaying device identifier to an external data processing system.

31. The article tracking method of claim 30, further comprising receiving passenger related information from an external database and sending a message including the passenger related information to an external data processing system.

32. The article tracking method of claim 20, further comprising aggregating relaying device messages and streaming the aggregated messages to the tracking device.

33. The article tracking method of claim 20, further comprising determining a time of arrival for the article at a particular relaying device having a known location based on the time the article is located within an acceptable distance from the particular relaying device.

34. The article tracking method of claim 20, further comprising sending the beacon identifier and the article identifier to the tracking device with a mobile application.

35. The article tracking method of claim 20, further comprising displaying the journey of the article to a user with a mobile application.

36. The article tracking method of claim 20, further comprising notifying a passenger or user when an article arrives at a particular relaying device having a known location with a mobile application.

* * * * *